United States Patent [19]

Itaba et al.

[11] Patent Number: 5,145,728
[45] Date of Patent: Sep. 8, 1992

[54] ORIENTED POLYETHYLENE FILM

[75] Inventors: Yasushi Itaba, Tokyo; Yutaka Yoshifuji, Saitama; Takayoshi Kondo, Tokyo; Keichiro Saitoh, Kanagawa; Tadao Yoshino, Saitama; Minoru Izawa, Saitama; Ichiro Sakamoto, Kanagawa, all of Japan

[73] Assignee: Toa Nenryo Kogyo Kabushiki Kaisha, Tokyo, Japan

[21] Appl. No.: 713,831

[22] Filed: Jun. 12, 1991

Related U.S. Application Data

[62] Division of Ser. No. 278,201, Nov. 30, 1988, Pat. No. 5,043,204.

[30] Foreign Application Priority Data

Nov. 30, 1987 [JP] Japan ................... 62-300071
Dec. 22, 1987 [JP] Japan ................... 62-322954
Dec. 25, 1987 [JP] Japan ................... 62-327408

[51] Int. Cl.$^5$ .................... B32B 27/16; B32B 27/32; C08L 23/06
[52] U.S. Cl. .................... 428/213; 428/212; 525/194; 525/211; 525/240

[58] Field of Search ............... 428/212, 213; 525/240, 525/194

[56] References Cited

U.S. PATENT DOCUMENTS

| | | | |
|---|---|---|---|
| 3,663,488 | 5/1972 | Kail | 524/528 |
| 4,597,920 | 7/1986 | Golike | 525/240 |
| 4,705,714 | 11/1987 | Itaba et al. | 525/192 |
| 4,790,676 | 12/1988 | Karatsu | 525/240 |

FOREIGN PATENT DOCUMENTS 58-059242 4/1983 Japan.
59-074139 4/1984 Japan.

Primary Examiner—Carman J. Seccuro, Jr.
Attorney, Agent, or Firm—Wenderoth, Lind & Ponack

[57] ABSTRACT

An oriented polyethylene film with an excellent moistureproofness and optical property is provided in which the degree of crosslinking is uniform or decreases inwardly across the thickness of the film, and which consists of a composition comprising (A) 50 to 90% by weight of polyethylene with a density of at least 0.935 g/cm$^3$ and a high load melt index to melt index ratio of at most 100 and (B) 50 to 10% by weight of a petroleum resin or linear low density polyethylene.

10 Claims, No Drawings

ORIENTED POLYETHYLENE FILM

This application is a division of Ser. No. 07/278,201 filed Nov. 30, 1988, now U.S. Pat. No. 5,043,204.

BACKGROUND OF THE INVENTION

1. Field of the Invention

This invention relates to an oriented polyethylene film with an excellent moistureproofness and optical property, comprising a composition of high density polyethylene and petroleum resins or linear low density polyethylene and having a specified crosslinking structure in the thickness structure of the film.

2. Description of the Prior Art

Generally, the property of a moistureproof wrapping material has been classified into four grades as to water vapor transmission rate, i.e. less than 1 g/m$^2$·24 hr, 2.5 g/m$^2$·24 hr, 5 g/m$^2$·24 hr and more than 5 g/m$^2$·24 hr. The class having a water vapor transmission rate of 5 g/m$^2$·24 hr corresponds to the so-called biaxially oriented polypropylene film (OPP film) and the class having that of 2.5 g/m$^2$·24 hr corresponds to the so-called KOP film consisting of OPP film coated with polyvinylidene chloride. For the class having a water vapor transmission rate of less than 1 g/m$^2$·24 hr, it is requied to subject the OPP film to vapor deposition with aluminum or to lamination with an aluminum foil.

On the other hand, high density polyethylene films having superior mechanical strength, coil resistance, edge opening and slippage have been applied to various uses including wrapping or packaging materials, but have not been used in the field where seeing-through is required because of being inferior in optical properties such as clarity and lustre, compared to polypropylene, low density polyethylene, polyvinyl chloride, etc. Therefore, it has been proposed to improve the clarity of polyethylene film by uniformly crosslinking by radiation and then biaxially stretching the film. However, the crosslinked and oriented polyethylene film obtained by this method is improved as to its clarity and strength, but does not have sufficient moistureproofness.

Thus, the inventors have proposed a polyethylene film which is crosslinked and oriented in such a manner that the degree of crosslinking inwardly decreases across the thickness of the film, and a process for producing the same, thus obtaining a crosslinked and oriented polyethylene film excellent in optical properties such as clarity and lustre and moistureproofness, as disclosed in Japanese Patent Laid-Open Publication Nos. 174321/1984 and 174322/1984.

However, this crosslinked and oriented polyethylene film has a more excellent moistureproofness than the OPP film, but the moistureproofness is not necessarily sufficient as compared with polyvinylidene chloride film.

Up to the present time, polyvinyl chloride, films, oriented polystyrene films, foamed polystyrene films, etc. have been used as a film for a shrink label of a oneway can or glass bottle. However, these films experience a problem of retort ability because of occurrence of deteriorations such as becoming hazy and splitting during retort sterilization although, these films are excellent in clarity, printability, heat shrinkage property, etc.

One the other hand, various polyolefin films for shrink lables are known which consist of linear low density polyethylene, a composition comprising linear low density polyethylene and polypropylene and a composition comprising polypropylene and a petroleum resin. However, these films also have the problems that the film consisting of linear low density polyethylene lacks firmness duing wrapping as a film for a shrink label and the films consisting of the above described compositions are inferior in low temperature shrinkage and retort ability.

In the field of twist wrapping, cellophane film has been used, but experiences a problem that it is inferior in moistureproofness and impart resistance at a low temperature such as in winter. On the other hand, monoaxially oriented polyethylene film has lately been used therefor, but this film tends to split. As this monoaxially oriented polyethylene film, there has been proposed a monoaxially oriented film consisting of a polyethylene having a density of 0.94 or more and a specified ratio of a melt index ($MI_{10}$) measured at a load of 10 kg and a melt index $MI_{2.16}$) measured at a load of 2.16 kg, as disclosed in Japanese Patent Publication No. 794/1977 and Japanese Patent Laid-Open Publication No. 68212/1984.

In the prior art polyethylene films for twist wrapping, however, the clarity and twist maintenance are improved, but the split resistance is not sufficient. Splitting tends to occur, in particular, when aluminum foils are applied in the form of stripes or a square article is wrapped. Therefore, it has eagerly been desired to develop a film for twist wrapping, whereby the above described problems can be solved.

SUMMARY OF THE INVENITON

It is an object of the present invention to provide an oriented polyethylene film comprising high density polyethylene as a predominant component and having excellent optical properties as well as an improved moistureproofness even in the form of a single layer.

It is another object of the present invention to provide an oriented polyethylene film with a superior moistureproofness and clarity, comprising a composition of high density polyethylene and petroleum resins and having a specified crosslinking structure in the thickness direction.

It is a further object of the present invention to provide an oriented polyethylene film for a shrink label, used for covering, protecting, displaying and decorating the outer surface of a oneway can or glass bottle.

It is a still further object of the present invention to provide an oriented polyethylene film for a shrink label, having a desired firmness and clarity for the shrink label and having improved properties of retort ability and low temperature shrinkage.

It is a still further object of the present invention to provide an oriented polyethylene film for twist wrapping, that is excellent in clarity, twist maintenance and split resistance.

These objects can be attained by an oriented polyethylene film such that the degree of crosslinking is uniform or decreases inwardly across the thickness of the film, which ccomprises a composition comprising (A) 50 to 90% by weight of polyethylene with a density of at least 0.935 g/cm$^3$ and a high load melt index to melt index ratio of at most 100 and (B) 50 to 10% by weight of a petroleum resin or linear low density polyethylene.

DETAILED DESCRIPTION OF THE INVENTION

The inventors have made various studies to develop an oriented and crosslinked polyethylene film having both excellent optical properties and mositureproofness and consequently, have found that it is effective to add a petroleum resin or linear low density polyethylene to polyeythylene with a specified density and high load melt index to melt index ratio and to crosslink a film of this composition in such a manner that the degree of crosslinking decreases inwardly across the thickness of the film. The present invention is based on this finding.

Accordingly, the present invention provides an oriented polyethylene film consisting of a composition comprising (A) 50 to 90% by weight, preferably 70 to 90% by weight of polyethylene having a density of at least 0.935 g/cm$^3$, high load melt index (hereinafter referred to as "HLMI")/melt index (hereinafter referred to as "MI") ratio of at most 100 and preferably an MI of 0.5 to 20 g/10 min, more preferably 0.5 to 5 g/10 min and (B) 50 to 10% by weight, preferably 30 to 10% by weight of a petroleum resin or linear low density polyethylene, the polyethylene film being crosslinked in such a manner that the degree of crosslinking inwardly decreases across the thickness of the film.

The polyethylene used in the present invention is crystalline ethylene homopolymer or ethylene-α-olefin copolymer produced by the medium or low-pressure process. It should have a density of 0.935 g/cm$^3$ or more, preferably 0.950 g/cm$^3$ or more. With a density of less than 0.935 g/cm$^3$, the polyethylene does not provide a film having improved moistureproofness. In addition, the polyethylene should have an HLMI/MI ratio of at most 100, preferably 26 to 50, more preferably 25 to 40. With an HLMI/MI ratio of larger than 100, the polyethylene provides a film which is poor in clarity and tends to stick to rolls during the film-forming process. Furthermore, the polyethylene preferably has an MI of 0.5 to 20 g/10 min, more preferably 0.5 to 5 g/10 min, most preferably 0.5 to 1 g/10 min, since if MI is less than 0.5 g/10 min, the polyethylene is poor in film-forming property, while if more than 20 g/10 min, the polyethylene does not provide a film which can uniformly be stretched.

The petroleum resin used in the present invention includes resins composed of, as a predominant component, cyclopentadiene type or higher olefin type hydrocarbons starting from petroleum type unsaturated hydrocarbons and hydrogenated petroleum resins obtained by hydrogenating these resins. Above all, it is preferable to use hydrogenated petroleum resins of cyclopentadiene type, having a softening point of 85° to 140° C.

Addition of the above described petroleum resins results in lowering the stretching temperature of the film and thus enlarging the stretching temperature range. The resulting oriented film is thus improved in twist ability, clarity, moistureproofness and antistatic property. If the quantity of the petroleum resin is too increased, however, various troubles occur, for example, deterioration of the clarity, so it should be in the range of up to 30% by weight, preferably 10 to 30% by weight, more preferably 2 to 10% by weight.

The linear low density polyethylene used in the present invention is composed of a linear principal chain obtained by copolymerizing ethylene and α-olefins such as butene-1, pentene-1, hexene-1, 4-methylpentene-1, heptene-1, octene-1 and the like by the low pressure gaseous phase method, solution method or liquid phase method, and has preferably a density of 0.890 to 0.935 g/cm$^3$, MI of 0.5 to 20 and weight average molecular weight $\bar{M}w$/number average molecular weight $\bar{M}n$ of 3 to 12.

The oriented polyethylene film of the present invention comprises 50 to 90% by weight, preferably 70 to 90% by weight, more preferably 75 to 85% by weight of the above described polyethylene and 50 to 10% by weight, preferably 30 to 10% by weight, more preferably 25 to 15% by weight of at least one member selected from the group consisting of petroleum resins and linear low density polyethylenes. If the quantity of the petroleum resins and linear low density polyethylenes is less than 10% by weight, the stretching temperature cannot be lowered and accordingly, the moistureproofness is not sufficiently improved, while if more than 50% by weight, the moistureproofness is improved, but the clarity and firmness are deteriorated.

The oriented polyethylene film according to the present invention can optionally contain antioxidants, antistatic agents, lubricants, ultraviolet ray absorbers, nucleation agents, antiblocking agents, coloring agents, etc. in addition to the above described polyethylene composition.

As described above, the stretching temperature of the crosslinked polyethylene film hereinafter described can be lowered by the addition of petroleum resins or linear low density polyethylenes to high density polyethylene, so that the heat shrinkage property of the resulting oriented polyethylene film be improved. The lowering of the stretching temperature results in enlargement of the stretching temperature range and economical merits, since the production of the film can readily be carried out.

The degree of crosslinking of the oriented polyethylene film decreases along the inward direction of the thickness of the film. The gel fraction (quantity of insoluble matters which are left undissolved when a sample is extracted with boiling p-xylene) corresponds to this degree of crosslinking and is preferably less than 5% by weight in the middle layer where the degree of crosslinking is lowest and 5% by weight or more in the opposite surface layers. In particular, there are preferably formed a crosslinked layer/uncrosslinked layer/crosslinked layer in the thickness direction of the film, in which the outer crosslinked layers have the same degree of crosslinking in the range of a gel fraction of 20 to 70% by weight and the middle uncrosslinked layer has the lowest gel fraction, i.e. 0% by weight, the thickness of each outer layer being preferably 0.1 to 10 times that of the middle layer. If the crosslinking is performed in such a manner that the above described degree of crosslinking does not decrease in the thickness direction of the film and in particular, the gel fraction of the middle layer, in which the degree of crosslinking should be lowest, is higher than 5%, the film is stretched uniformly and improved in clarity, but the film having improved moistureproofness, which is the principal object of the present invention, cannot be obtained.

The oriented polyethylene film of the present invention is obtained by biaxially stretching a crosslinked stock sheet with a draw ratio of preferably at least 3 times, more preferably at least 4 times in both longitudinal (MD) and lateral (TD) directions. When the stretching is carried out monoaxially or the draw ratio is lower than 3 times, uniform stretching is impossible and the resulting film is not sufficiently improved in moistureproofness and clarity.

A process for producing the oriented polyethylene film according to the present invention will now be illustrated.

In the production of the oriented polyethylene film according to the present invention, a composition comprising a high density polyethylene and petroleum resin or linear low density polyethylene are firstly fed to a commonly used extruder and formed into a flat or tubular stock sheet by melt extrusion, followed by cooling and solidifying. The melt extrusion is generally carried out by extrusion from a conventional T-die to form a flat sheet, by extrusion from an annular die to form a tubular sheet, by extrusion from an annular die to form a tubular sheet and then cutting one or both edges of the tubular sheet to form a flat sheet, etc. In these cases, the thickness of the stock sheet should be such that the sheet can be crosslinked so that the degree of crosslinking decreases across its thickness from both surfaces toward the middle. It is generally determined according to the draw ratio and the film thickness after stretching, but is usually 210 to 2000 $\mu$m, preferably 400 to 1000 $\mu$m since the thickness in this range is adequate to handle the stock sheet with ease and to accomplish the crosslinking as described above.

According to the present invention, the flat or tubular stock sheet consisting of a composition comprising a high density polyethylene and petroleum resin or linear low density polyethylene should be cross-linked in such a manner that the degree of crosslinking inwardly decreases toward the middle across the thickness of the sheet from both the surfaces. In order to achieve the object of the present invention, the degree of crosslinking, expressed in terms of gel fraction, should preferably be such that in the above described crosslinking structure of the stock sheet, the gel fraction is 0 to 5% in the middle layer portion where the degree of crosslinking is lowest, and the gel fraction is 5% or more, preferably 20 to 70% in the opposite surface layer portions where the degree of crosslinking is highest. In the case where the middle layer portion has a gel fraction of 0% in which the degree of crosslinking is lowest and there are formed a crosslinked layer/uncrosslinked layer/crosslinked layer in the thickness direction of the stock sheet, the thickness ratio of these layers is preferably in the range of uncrosslinked layer: each crosslinked layer = 1:0.1 to 10 and more preferably both the outer layer portions have the same degree of crosslinking.

If the crosslinking is performed in such a manner that the degree of crosslinking does not decrease in the thickness direction of the stock sheet and in particular, the gel fraction of the middle layer, in which the degree of crosslinking should be lowest, is higher than 5%, the stock sheet is stretched uniformly and improved in clarity, but the film having improved moistureproofness, which is the principal object of the present invention, cannot be obtained. On the other hand, if crosslinking is performed in such a manner that the gel fraction in the outer layers is lower than 20%, the stock sheet cannot be stretched uniformly and the resulting film is not improved in clarity and moistureproofness, while if crosslinking is performed in such a manner that the gel fraction in the outer layers exceeds 70%, the stock sheet tends to break during stretching and cannot be stretched smoothly. If crosslinking is performed in such a manner that the stock sheet is crosslinked uniformly across the thickness, the stock sheet can be stretched uniformly with improved clarity, but the moistureproofness is not improved. The preferred maximum crosslinking produces a gel fraction in the outer layers between about 40 and 70%. If crosslinking is performed in such a manner that only one of the outer layers of the stock sheet is crosslinked, the stock sheet tends to break during stretching. If crosslinking is performed in such a manner that the degree of crosslinking decreases unidirectionally across the thickness from one surface to the other, the resulting film is not satisfactorily improved in clarity and moistureproofness.

The above described crosslinking can be carried out, for example, by irradiating both the surfaces of a stock sheet with an electron beam or by multilayer coextrusion in which the polyethylene composition for individual layers contains a different amount of crosslinking agent such as organic peroxides.

The dosage of irradiation with an electron beam varies depending on the thickness of the stock sheet and the type, molecular weight and molecular weight distribution of a polyethylene resin, but it is usually 5 to 50 Mrad and preferably 15 to 30 Mrad. Both sides of the stock sheet may be irradiated at one time or one after the other, or repeatedly several times. More preferably, both sides should be irradiated with the same dosage. The penetrating power of the electron beam should properly be adjusted according to the thickness of the stock sheet by changing the applied voltage or by using a shield.

The dosage of the electron beam can be adjusted for example in the following manner: When a stock sheet which is 500 $\mu$m thick is to be irradiated, for example, a sample is prepared by tightly laying 25 pieces of 20 $\mu$m thick film on top of one another, irradiating the sample from both sides thereof with the same dosage of electron beam, taking apart the crosslinked sample in the 25 pieces of 20 $\mu$m thick film and measuring the degree of crosslinking in the individual films. The result of this measurement tells the degree of crosslinking which various across the thickness of the sample. The thus obtained data reveal the relationship between the thickness of the stock sheet and the degree of crosslinking or the dosage of irradiation.

The above described irradiation with electron rays should preferably be carried out in an atmosphere of nitrogen, argon, helium or other inert gases. Irradiation with electron beam in the air is possible, but this results in films which are not satisfactorily improved in clarity.

The crosslinking by the multilayer coextrusion is accomplished in such a manner that a polyethylene composition containing a crosslinking agent such as organic peroxides is fed to an extruder which forms both outer layers in the case of a flat stock sheet or the inner and outer layers in the case of a tubular stock sheet, and another polyethylene composition containing no organic peroxide or containing an organic peroxide just enough to achieve the minimum degree of crosslinking is fed to the extruder which forms the intermediate layer, and the polyethylene compositions are coextruded and crosslinked at a temperature of higher than the melting points thereof.

The crosslinked stock sheet is then heated and stretched uniaxially or biaxially at a predetermined draw ratio by the conventional rolling, tentering or tubular method. Biaxial orientation may be accomplished by either simultaneous stretching or sequential stretching.

The stretching temperature should preferably be a temperature of from the softening point to the melting point of polyethylene, more preferably a 12° to 25° C. lower temperature than the melting point of polyethylene. Specifically, it is 70° to 135° C. and preferably 110° to 123° C. If the stretching temperature is lower than the softening point, softening of the resin is insufficient and uniform and stable stretching is impossible, while if higher than the melting point, uniform stretching is possible, but the moistureproofness of the resulting film is not sufficiently improved. In order to perform uniform and stable stretching and simultaneously improve the clarity and moistureproofness of the film, in particular, the stretching should preferably be performed at a temperature of 12° to 25° C. lower than the melting point of polyethylene.

The draw ratio should preferably be greater than 3 times, more preferably greater than 4 times in both longitudinal and lateral directions. When the draw ratio is lower than 3 times, uniform stretching is impossible and the resulting oriented film is not sufficiently improved in moistureproofness and clarity as the principal object of the present invention.

The oriented film thus obtained has heat-shrinkable properties. If the oriented film is to be used as a substrate of a composite film for packaging, therefore, it should preferably be subjected to heat setting at a temperature of lower than the melting point of the oriented film, for example, 110° to 140° C. so that the heat shrinkage ratio in the lateral direction is reduced to 1.5% or less, more preferably 1.0% or less.

In one preferred embodiment of the present invention, there is provided a film for a shrink label, consisting of a composition comprising 50 to 85% by weight, preferably 50 to 80% by weight, of high density polyethylene having a density of at least 0.935 g/cm$^3$ and HLMI/MI ratio of at most 50 and 50 to 15% by weight, preferably 50 to 20% by weight of a petroleum resin and/or linear low density polyethylene, the quantity of the petroleum resin being at most 25% by weight, and being crosslinked in such a manner that the degree of crosslinking inwardly decreases in the thickness direction of the film or an uncrosslinked portion is formed, and oriented at least uniaxially.

The film for a shrink label according to the present embodiment is a uaxially oriented film obtained by stretching a stock sheet by at least 5 times, preferably 7 to 11 times in one direction, or a biaxially oriented film obtained by further stretching the said uniaxially oriented film by at most 1.5 times, preferably at most 1.1 times in a direction vertical to the said stretching direction. The above described draw ratio is preferred from the standpoint of uniformly forming the film for a shrink label as the object of this embodiment. The thickness of the film in this embodiment is not particularly limited, but is suitably chosen depending on the object or use, and preferably is in the range of 20 to 150 μm.

The film for a shrink label according to the present embodiment can optionally contain antioxidants, antistatic agents, lubricants, ultraviolet ray absorbers, nucleation agents, antiblocking agents, coloring agents, etc. in addition to the above described polyethylene composition.

Production of the film for a shrink label of this embodiment is generally carried out as follows: The above described composition comprising high density polyethylene and a petroleum resin and/or linear low density polyethylene and optionally additives are firstly mixed and subjected to melt extrusion by the ordinary T-die method or inflation method, followed by cooling and solidifying to form a stock sheet (non-oriented film). The thickness of this stock sheet, depending on that of the oriented film to be produced, is generally about 100 to 1000 μm. Then, this stock sheet is crosslinked from both the surfaces in the same manner as described above and uniaxially stretched in the longitudinal direction (MD) or lateral direction (TD), or biaxially stretched in both the directions of MD and TD with a predetermined draw ratio by the known method. The stretching temperature should be as low as possible so as to obtain a sufficient heat shrinkage at a low temperature, and is preferably 120° C., more preferably 80° to 110° C. Since the film of this embodiment contains a petroleum resin and/or linear low density polyethylene and has the specified crosslinking structure, the tension during stretching is lowered and uniform stretching is possible even at a low temperature and with a high draw ratio, thus giving an oriented film superior in clarity.

The film for a shrink label according to the present embodiment can optionally be subjected to various surface treatments such as corona discharge treatment in order to improve the printability.

In another preferred embodiment of the present invention, there is provided a film for twist wrapping, consisting of a composition comprising polyethylene having a density of at least 0.935 g/cm$^3$ and HLMI/MI ratio of at most 50, or the said polyethylene with a petroleum resin and being crosslinked with a gel fraction of preferably 20 to 70% by weight and stretched at least in one direction by preferably 6 times or more. The amount of the petroleum resin is preferably 2–10% by weight.

In this embodiment, the polyethylene is ethylene homopolymer, an ethylene-containing copolymer or mixture thereof having a density of at least 0.935 g/cm$^3$, preferably at least 0.950 and an HLMI/MI ratio of at most 50, preferably 25 to 40. More preferably, MI is in the range of 0.5 to 20 g/10 min in view of the shaping property of the film. If the density of the polyethylene is less than 0.935 g/cm$^3$, the oriented film is lacking in firmness and twist property and its moistureproofness is not sufficient. With an HLMI/MI ratio of exceeding 50, the clarity is deteriorated.

The film for twist wrapping according to this embodiment can optionally contain antioxidants, antistatic agents, lubricants, ultraviolet ray absorbers, nucleation agents, antiblocking agents, coloring agents, etc. in addition to the above described polyethylene and petroleum resin.

The film for twist wrapping in this embodiment is such a crosslinked film that the degree of crosslinking, expressed in terms of gel fraction, is preferably at least 5% by weight, more preferably 30 to 60% by weight. If the gel fraction is less than 30% by weight, the crosslinking is insufficient so that the oriented film will be inferior in split resistance and clarity, while if more than 60% by weight, the crosslinking is too excessive to stretch well and the draw ratio is extremely limited, which is not favorable. The crosslinking is performed in such a manner that the degree of crosslinking is not only uniform across the thickness of the film, but also inwardly decreases across the thickness of the film from both the surfaces, or an uncrosslinked layer portion is formed to give a structure of crosslinked layer/uncrosslinked layer/crosslinked layer in the thickness direction of the film. In this case, the gel fraction of the crosslinked layer portion is in the same range as described above and the ratio of the crosslinked layer and uncrosslinked layer is preferably in the range of 1:0.1 to 10. Such a specified crosslinked structure is preferable so as to further improve the moistureproofness of the oriented film.

The film for twist wrapping according to the present embodiment is a uniaxially oriented film obtained by stretching a stock sheet by at least 6 times, preferably 7 to 11 times in one direction, or a biaxially oriented film obtained by stretching a stock sheet by at most 1.5 times, preferably at most 1.1 times in one direction and further stretching by at least 6 times, preferably 7 to 12 times in the vertical direction thereto. When the draw ratio is outside the above described range, an oriented film superior in uniformity and clarity can hardly be obtained and its twist ability is not sufficient. This is not favorable.

Production of the film for twist wrapping of this embodiment is generally carried out as follows: The above described polyethylene or a composition comprising the polyethylene and a petroleum resin is optionally mixed with additives and subjected to melt extrusion by the ordinary T-die method or inflation method, followed by cooling and solidifying to form a stock sheet (non-oriented film). The thickness of this stock sheet, depending on that of an oriented film to be produced, is generally about 100 to 500 μm. Then, this stock sheet is crosslinked as described above and uniaxially stretched in the longitudinal direction (MD) or lateral direction (TD), or biaxially stretched in both the directions of MD and TD with a predetermined draw ratio by the known stretching method. If necessary, the thus obtained oriented film can be subjected to a heat setting treatment.

The crosslinking in this embodiment is preferably carried out by subjecting both the surfaces of a stock sheet to electron beam irradiation with a dosage of 10 to 30 Mrad and uniformly crosslinking. This is desirable from the standpoint of preventing the film from curling.

The film for twist wrapping according to the present embodiment can optionally be subjected to a corona discharge treatment for the purpose of improving the printability or making easy lamination.

The following examples are given in order to illustrate the present invention in detail without limiting the same, in which percents and parts are to be taken as those by weight unless otherwise indicated. Test methods employed herein to evaluate the film performances are given below:

(1) Water Vapor Transmission Rate: JIS Z 0208, Method B
(2) Haze: JIS K 6714
(3) Gel Fraction: ASTM D 2765, Method A
(4) MI, HLMI: JIS K 6760 (HLMI: load 21.6 kg)
(5) Stiffness: ASTM D 882
(6) Heat Shrinkage: JIS Z 1709
(7) Shrinkage Property: A cylinder is prepared by coating one side edge of the shorter sides of a rectangular film with 50 μm thickness×230 mm width×100 mm length with a urethane type adhesive in a width of 5 mm and sticking both the shorter sides. This cylinder is put on a commercially available glass bottle with an inner volume of 300 ml and then subjected to heat shrinkage for 30 seconds using a shrinking tunnel (made by Kyowa Denki KK) at 230° C. A sample film showing a close contact with the glass bottle is evaluated as ◯ and a sample film showing a clearance between the film and bottle is evaluated as x.

(8) Retort Ability: A vessel is covered with a sample film, subjected to heat shrinkage, charged in a retort and heated at 125° C. for 30 minutes to find change of the state or shape of the film, such as becoming hazy, splitting, etc. A sample film showing no change is evaluated as ◯ and a sample film showing such a change is evaluated as x.

(9) Tensile Elongation at Break: ASTM D 882

(10) Loosening of Twist: Using a twist wrapping machine, a round piece of candy of 20 mm in diameter is wrapped with a film of 75 mm×95 mm×0.025 mm while twisting 1.5 times both the ends of the film. After the thus wrapped candy is allowed to stand at room temperature (temperature 20° C., humidity: 50%) for 24 hours, loosening of the twist is observed. A sample film showing no loosening of the twist is evaluated as ◯ and a sample film showing some loosening is evaluated as x.

(11) Twist Split: 100 candies in the form of a rectangular parallelepiped of 20 mm×13 mm×13 mm is twist-wrapped with a film of 75 mm in width, to which an Al foil of 25 mm in width and 7 μm in thickness is adhered with wax at the center thereof, in an analogous manner to the above described item (10). A sample film showing no occurrence of splitting during the same time is evaluated as ◯ and a sample film showing splits is evaluated as x.

EXAMPLE 1

High density polyethylene powder (density 0.957 g/cm$^3$, MI 0.7 g/10 min., HLMI/MI 45.6) was dry blended with 20% of a petroleum resin of hydrogenation type (Escorez -commercial name- made by Exxon Chemical Co., softening point 125° C.) and pelletized at 210° C. using a biaxial extruder. The resulting pellets were formed into a 480 μm thick stock sheet at a resin temperature of 240° C. and chilled roll temperature of 90° C. using a T-die extruder of 40 mmφ. Both sides of the stock sheet were then irradiated with electron rays at a dosage of 20 Mrad (irradiation voltage 165 KV).

The gradient of the degree of crosslinking across the thickness of the stock sheet was estimated in the following manner. 24 pieces of 20 μm thick films were laid on top of one another to make a 480 μm thick test specimen. The specimen was irradiated under the same conditions as described above. After irradiation, the specimen was taken apart and the degree of crosslinking of the individual films was examined to find that the maximum gell fraction was 43% in the outer layers and the minimum gel fraction was 0% in the inner layer in the thickness direction of the specimen. Furthermore, the irradiated stock sheet was found to be composed of a crosslinked outer layer/uncrosslinked inner layer/crosslinked outer layer, the ratio of their thickness being 1:1.0:1.

The crosslinked stock sheet was heated at 120° C. and then stretched 4 times (400% by length) in the longitudinal direction and 6 times (600% by length) in the lateral direction sequentially by using a tenter-type biaxial stretching machine, thus obtaining a 20 μm thick oriented film having the properties as shown Table 1.

EXAMPLES 2 to 8 and COMPARATIVE EXAMPLES 1 and 2

The procedure of Example 1 was repeated except using various kinds of high density polyethylene and petroleum resins of hydrogenation type (Escorez) and forming conditions shown in Table 1, thus obtaining various oriented films with the properties as shown in Table 1.

blended as shown in Table 2, extruded at 250° C. by means of a T-die extruder and cooled to form a stock sheet. Both sides of the stock sheet were then irradiated

TABLE 1

| Example | Polyethylene Density (g/cm³) | Polyethylene MI (g/10 min) | HLMI/MI | Hydrogenated Petroleum Resin Kind | Hydrogenated Petroleum Resin Softening Point (°C.) | Blend Ratio (wt %) | Stock Sheet Thickness (μ) | Degree of Crosslinking of Stock Sheet Crossed/Uncrossed/Crossed Layers (Ratio) | Gel Fraction Irradiated (%) | Gel Fraction Minimum (%) | Gel Fraction Irradiated (%) |
|---|---|---|---|---|---|---|---|---|---|---|---|
| 1 | 0.957 | 1.0 | 45.6 | Escorez 5320 | 125 | 20 | 480 | 1:1:1 | 43 | 0 | 43 |
| 2 | 0.957 | 1.0 | 45.6 | Escorez 5320 | 125 | 15 | 480 | " | 45 | 0 | 45 |
| 3 | 0.957 | 1.0 | 45.6 | Escorez 5300 | 100 | 20 | 480 | " | 41 | 0 | 41 |
| 4 | 0.957 | 1.0 | 45.6 | Escorez 5280 | 85 | 20 | 480 | " | 40 | 0 | 40 |
| 5 | 0.957 | 0.8 | 26.4 | Escorez 5320 | 125 | 20 | 480 | " | 45 | 0 | 45 |
| 6 | 0.959 | 1.0 | 66.0 | Escorez 5320 | 125 | 20 | 480 | " | 40 | 0 | 40 |
| 7 | 0.957 | 1.0 | 45.6 | Escorez 5320 | 125 | 30 | 480 | " | 43 | 0 | 43 |
| 8 | 0.960 | 4.5 | 25.8 | Escorez 5320 | 125 | 20 | 480 | " | 40 | 0 | 40 |
| Comparison 1 | 0.959 | 1.0 | 66.0 | Escorez 5320 | 125 | 5 | 480 | " | 48 | 0 | 48 |
| 2 | 0.959 | 1.0 | 66.0 | — | — | — | 480 | " | 50 | 0 | 50 |

| Example | Stretching Conditions Temperature (°C.) | Stretching Conditions Draw Ratio (MD × TD) | Oriented Film Thickness (μ) | Oriented Film Haze (%) | Water Vapor Transmission Rate (g/m²/24 hrs) |
|---|---|---|---|---|---|
| 1 | 120 | 4 × 6 | 20 | 2.7 | 2.0 |
| 2 | 122 | 4 × 6 | 20 | 2.5 | 2.2 |
| 3 | 118 | 4 × 6 | 20 | 2.4 | 2.1 |
| 4 | 115 | 4 × 6 | 20 | 2.4 | 2.2 |
| 5 | 120 | 4 × 6 | 20 | 2.3 | 2.4 |
| 6 | 120 | 4 × 6 | 20 | 2.7 | 1.8 |
| 7 | 120 | 4 × 6 | 20 | 3.3 | 2.1 |
| 8 | 120 | 4 × 6 | 20 | 3.0 | 1.7 |
| Comparison 1 | 125 | 4 × 6 | 20 | 2.5 | 2.8 |
| 2 | 127 | 4 × 6 | 20 | 2.4 | 3.0 |

EXAMPLES 9 to 14 and COMPARATIVE EXAMPLES 3 to 6

High density polyethylene having a density and HLMI/MI ratio as shown in Table 2, linear low density polyethylene (density 0.924 g/cm³, MI 2.0 g/10 min) and petroleum resin (Escorez E 5280 (softening point 85° C.) or Escorez E 5300 (softening point 100° C.) -commercial name- made by Exxon Chemical Co.) were blended as shown in Table 2, extruded at 250° C. by means of a T-die extruder and cooled to form a stock sheet. Both sides of the stock sheet were then irradiated with electron rays at a dosage of 20 Mrad to obtain a non-oriented crosslinked sheet having a gel fraction as shown in Table 2, which was then stretched under conditions as shown in Table 2, thus obtaining an oriented film having the properties as shown in Table 2.

For comparison, a commercially available polyvinyl chloride film for a shrink label (thickness 50 μm) was subjected to the similar test to obtain results shown in Table 2.

TABLE 2

| Example | Resin Composition Polyethylene Density (g/cm³) | Resin Composition Polyethylene MI HLMI/MI | Resin Composition Polyethylene Blend Ratio (wt %) | Resin Composition Linear Low Density Polyethylene (wt %) | Resin Composition Petroleum Resin (wt %) | Stock Sheet Thickness (μ) | Degree of Crosslinking of Non-oriented Sheet Crossed/Uncrossed/Crossed Layers (Ratio) | Gel Fraction Irradiated (%) | Gel Fraction Minimum (%) | Gel Fraction Irradiated (%) | Stretching Conditions Temperature (°C.) | Stretching Conditions Draw Ratio (MD × TD) |
|---|---|---|---|---|---|---|---|---|---|---|---|---|
| 9 | 0.953 | 0.7 27 | 60 | 25 | E5280 15 | 400 | 1:0.5:1 | 50 | 0 | 50 | 110 | 1.1 × 7 |
| 10 | 0.953 | 0.7 27 | 60 | 25 | E5300 15 | 400 | " | 52 | 0 | 52 | 110 | 1.1 × 7 |
| 11 | 0.953 | 0.7 27 | 50 | 50 | — | 400 | " | 53 | 0 | 53 | 110 | 1.1 × 7 |
| 12 | 0.953 | 0.7 27 | 75 | — | E5280 25 | 400 | " | 48 | 0 | 48 | 110 | 1.1 × 7 |
| 13 | 0.953 | 0.7 27 | 60 | 25 | E5280 | 400 | 1:1.3:1 | 50 | 0 | 50 | 105 | 1.1 × 7 |

TABLE 2-continued

| | | 27 | | | 15 | | | | | | | | |
|---|---|---|---|---|---|---|---|---|---|---|---|---|---|
| 14 | 0.960 | 1.5 | 60 | 25 | E5280 | 400 | 1:0.5:1 | 49 | 0 | 49 | 110 | 1.1 × 7 |
| | | 45 | | | 15 | | | | | | | |
| Comparison | | | | | | | | | | | | |
| 3 | 0.953 | 0.7 | 100 | — | — | 400 | 1:0.5:1 | 53 | 0 | 53 | 120 | 1.1 × 7 |
| | | 27 | | | | | | | | | | |
| 4 | 0.956 | 0.5 | 50 | 50 | — | 400 | 1:0.5:1 | 50 | 0 | 50 | 110 | 1.1 × 7 |
| | | 80 | | | | | | | | | | |
| 5 | — | — | — | 100 | — | 400 | 1:0.5:1 | 54 | 0 | 54 | 100 | 1.1 × 7 |
| 6 | PVC | — | — | — | — | — | — | — | — | — | — | — |

| | | | | Oriented Film | | | |
|---|---|---|---|---|---|---|---|
| Example | Thickness (μ) | Haze (%) | Stiffness (kg/cm²) | Heat Shrinkage in TD (%) 100° C. | 120° C. | Shrinkage Property | Retort Aptitude |
| 9 | 50 | 3.7 | 11000 | 21 | 54 | ○ | ○ |
| 10 | 50 | 4.9 | 11000 | 17 | 47 | ○ | ○ |
| 11 | 50 | 5.0 | 13000 | 20 | 59 | ○ | ○ |
| 12 | 50 | 4.0 | 16000 | 23 | 60 | ○ | ○ |
| 13 | 50 | 4.5 | 12000 | 20 | 60 | ○ | ○ |
| 14 | 50 | 4.0 | 12500 | 18 | 50 | ○ | ○ |
| Comparison | | | | | | | |
| 3 | 50 | 2.5 | 26000 | 3.0 | 15.0 | Wrinpled | ○ |
| 4 | 50 | 12.5 | 13500 | 20 | 60 | ○ | ○ |
| 5 | 50 | 2.3 | 6000 | 25 | 75 | x | ○ |
| 6 | 50 | 4.9 | 12000 | 53 | 58 | ○ | x |

EXAMPLES 15 TO 21 AND COMPARATIVE EXAMPLES 7 TO 9

High density polyethylene having a density and HLMI/MI ratio as shown in Table 3 and petroleum resin (Escorez E 5320 (softening point 125° C.)—commercial name—made by Exxon Chemical Co.) were blended as shown in Table 3, extruded at 240° C. by means of a T-die extruder and cooled to form a stock sheet. Both sides of the stock sheet were then irradiated with electron rays at a dosage of 20 Mrad to obtain a crosslinked sheet having a gel fraction as shown in Table 3, which was then stretched under conditions as shown in Table 3, thus obtaining an oriented film having the properties as shown in Table 3.

For comparison, two commercially available sample films for twist wrapping (MD- or TD-uniaxially stretched film of uncrosslinked high density polyethylene, thickness 25 μm, hereinafter referred to as commercially available article-1 or -2) were subjected to the similar test to obtain results shown in Table 3.

TABLE 3

| | Polyethylene | | Petroleum Resin Blend Ratio (wt %) | Thickness (μ) | Crosslinked Sheet | | | | Stretching Conditions | |
|---|---|---|---|---|---|---|---|---|---|---|
| | | | | | Crosslinked/Un-Crosslinked/Crosslinked Layers (Ratio) | Gel Fraction (wt %) | | | Temperature (°C.) | Draw Ratio (MD × TD) |
| Example | Density (g/cm³) | MI HLMI/MI | | | | Irradiated | Minimum | Irradiated | | |
| 15 | 0.953 | 0.7 27 | 0 | 375 | 1:1:1 | 50 | 0 | 50 | 130 | 1.5 × 10 |
| 16 | 0.953 | 0.7 27 | 0 | 275 | 1:0.2:1 | 50 | 0 | 50 | 132 | 1.1 × 10 |
| 17 | 0.953 | 0.7 27 | 5 | 275 | 1:0.2:1 | 48 | 0 | 48 | 128 | 1.1 × 10 |
| 18 | 0.953 | 0.7 27 | 10 | 250 | Uniformly Crosslinked | | 45* | | 128 | 1.0 × 10 |
| 19 | 0.953 | 0.7 27 | 10 | 300 | 1:0.4:1 | 47 | 0 | 48 | 130 | 1.0 × 12 |
| 20 | 0.953 | 0.7 27 | 0 | 175 | Uniformly Crosslinked | | 50* | | 130 | 7 × 0 |
| 21 | 0.959 | 4.5 43 | 10 | 250 | Uniformly Crosslinked | | 42* | | 128 | 1.0 × 12 |
| Comparison | | | | | | | | | | |
| 7 | 0.960 | 0.7 67 | 0 | 275 | 1:0.2:1 | 48 | 0 | 48 | 130 | 1.1 × 10 |
| 8 | Commercially Available Article (MD) | — | — | — | — | — | — | — | — | — |
| 9 | Commercially Available Article (MD) | — | — | — | — | — | — | — | — | — |

| | | | Oriented Film | | |
|---|---|---|---|---|---|
| | Thickness | Haze | Tensile Elongation (%) at Break | | Twist Aptitude |

TABLE 3-continued

| Example | (μ) | (%) | MD | TD | Loosening | Split Resistance |
|---|---|---|---|---|---|---|
| 15 | 25 | 2.5 | 490 | 40 | ○ | ○ |
| 16 | 25 | 2.7 | 500(+) | 50 | ○ | ○ |
| 17 | 25 | 2.2 | 500(+) | 45 | ○ | ○ |
| 18 | 25 | 2.5 | 500(+) | 40 | ○ | ○ |
| 19 | 25 | 3.0 | 500(+) | 35 | ○ | ○ |
| 20 | 25 | 2.0 | 30 | 500(+) | ○ | ○ |
| 21 | 25 | 2.9 | 500(+) | 38 | ○ | ○ |
| Comparison | | | | | | |
| 7 | 25 | 7.0 | 500(+) | 40 | ○ | ○ |
| 8 | 25 | 60 | 10 | 8 | ○ | x |
| 9 | 25 | 2.5 | 20 | 5 | ○ | x |

Since the oriented polyethylene film of the present invention is composed of a blend of high density polyethylene and linear low density polyethylene or petroleum resins and has the specified crosslinked structure across the thickness of the film, it exhibits an excellent moistureproofness, i.e. water vapor transmission rate of at most 2.5 g/m$_2$·24 hr·20 μm as well as superior optical properties such as clarity and lustre. Furthermore, the production process is improved by the blend of petroleum resins, for example, more uniform stretching can be accomplished at low temperatures, as compared with the prior art.

The oriented polyethylene film of the present invention can be applied to various uses including wrapping or packaging materials because of the above described superior properties and in particular, it is suitable for use as wrapping materials needing superior optical properties and moistureproofness.

When the oriented polyethylene film of the present invention is used as a film for a shrink label, for example, there can be given further advantages, i.e. more excellent low temperature shrinkage property and retort ability in addition to the superior firmness and clarity required for wrapping. Because of the possibility of low temperature stretching, the range of the stretching temperature can be enlarged, thus resulting in easy production of the same.

When the oriented polyethylene film of the present invention is used as a film for twist wrapping, the specified high density polyethylene or a blend of the same with petroleum resins is used as a basic material, and crosslinked and stretched. Therefore, even a product obtained by stretching with a higher draw ratio in one direction does not exhibit fibrillation due to orientation and can give a larger elongation in the direction vertical to the stretching direction, thus resulting in a larger split resistance that cannot be obtained in the prior art, in addition to the superior clarity and twist maintenance. When blending petroleum resins, moreover, the clarity and twist ability can further be improved and the temperature during stretching can be lowered so that the range of the stretching temperature can be enlarged to make production of the film easy.

What is claimed is:

1. A film for a shrink label, consisting of a composition comprising 50 to 85% by weight of high density polyethylene having a density of at least 0.935 g/cm$^3$ and high load melt index to melt index ratio or at most 50, and 15 to 50% by weight of a linear low density polyethylene and a petroleum resin, the quantity of the petroleum resin being at most 25% by weight, and being crosslinked in such a manner that the degree of crosslinking inwardly decreases across the thickness of the film or an uncrosslinked portion is formed, and oriented at least in one direction.

2. The film as claimed in claim 1, wherein the petroleum resin is selected from the group consisting of resins substantially composed of cyclopentadiene type and higher olefin type hydrocarbons and hydrogenated products of these resins.

3. The film as claimed in claim 1, wherein the high density polyethylene is crystalline ethylene homopolymer or ethylene-α-olefin copolymer produced by a medium- or low-pressure process.

4. The film as claimed in claim 1, wherein the linear low density polyethylene is selected from the group consisting of copolymers of ethylene and α-olefins.

5. The film in claim 4, wherein the α-olefins are butene-1, pentene-1, hexene-1, 4-methylpentene-1, heptene-1 and octene-1.

6. The film as claimed in claim 1, wherein the linear low density polyethylene has a density of 0.890 to 0.935 g/cm$^3$, MI of 0.5 to 20 and weight average molecular weight $\overline{M}w$/number average molecular weight $\overline{M}n$ ratio of 3 to 12.

7. The film as claimed in claim 1, wherein the crosslinking is carried out in such a manner as to form a sheet wherein the opposite outer layer portions of the sheet each have gel fractions of between 20 to 70% by weight and the middle layer portion of the sheet has gel fractions between 0 to 5% by weight.

8. The film as claimed in claim 7, wherein the outer layer portions are crosslinked and the middle layer portion is uncrosslinked, the thickness ratio of the outer layer portion/middle layer portion/outer layer portion thereof ranging from 1:0.1:1 to 1:10:1.

9. The film as claimed in claim 1, wherein the crosslinking is carried out by irradiating both surfaces of a stock sheet with electron beam.

10. The film as claimed in claim 1, obtained by stretching a crosslinked stock sheet at least in one direction with a draw ratio of at least 300%.

* * * * *